United States Patent
Maddali et al.

(10) Patent No.: US 9,934,214 B2
(45) Date of Patent: Apr. 3, 2018

(54) DOM SNAPSHOT CAPTURE

(71) Applicant: INTERNATIONAL BUSINESS MACHINES CORPORATION, Armonk, NY (US)

(72) Inventors: Lalith Maddali, Fremont, CA (US); Manoj Punjabi, Dublin, CA (US); Haixiao Yu, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 41 days.

(21) Appl. No.: 14/567,479

(22) Filed: Dec. 11, 2014

(65) Prior Publication Data

US 2016/0170943 A1    Jun. 16, 2016

(51) Int. Cl.
G06F 17/24     (2006.01)
G06F 17/30     (2006.01)
H04L 29/08     (2006.01)

(52) U.S. Cl.
CPC ...... *G06F 17/246* (2013.01); *G06F 17/30896* (2013.01); *H04L 67/02* (2013.01)

(58) Field of Classification Search
CPC .................. G06F 17/246; G06F 17/30896
See application file for complete search history.

(56) References Cited

U.S. PATENT DOCUMENTS

| | | | |
|---|---|---|---|
| 8,286,076 B1 | 10/2012 | Szewczyk | |
| 2010/0174774 A1* | 7/2010 | Kern | H04L 29/06 709/203 |
| 2011/0125593 A1* | 5/2011 | Wright | G06Q 30/02 705/14.73 |
| 2011/0191676 A1 | 8/2011 | Guttman et al. | |
| 2012/0311429 A1 | 12/2012 | Decker et al. | |
| 2013/0073950 A1 | 3/2013 | Kern et al. | |
| 2014/0068419 A1* | 3/2014 | Bourke | G06F 17/3089 715/235 |
| 2015/0161088 A1* | 6/2015 | Kamada | G06F 17/2247 715/235 |

(Continued)

OTHER PUBLICATIONS

Arora A., Web Applications Testing: A Review on Techniques, Tools and State of Art, Feb. 2012, vol. 3, pp. 1-6.*

(Continued)

*Primary Examiner* — Kavita Padmanabhan
*Assistant Examiner* — Ahmad M El-Bkaily
(74) *Attorney, Agent, or Firm* — Law Office of Jim Boice

(57) ABSTRACT

In response to detecting a user-defined event on a client computer, a DOM snapshot of a DOM is captured. The DOM snapshot is of a DOM being used to generate an image on a display of the client computer. A hypertext markup language (HTML) request is populated with the DOM snapshot. The HTML request is a virtual request that directs a recipient to save the HTML request without returning a webpage upon receipt. The HTML request with the DOM snapshot is transmitted to an HTML server. Subsequently, a request for the DOM snapshot is transmitted from the client computer to the HTML server. The client computer receives an HTML response from the HTML server. The HTML response HTML response includes the DOM snapshot. An image is generated on a display of the client computer using the DOM snapshot from the HTML response.

10 Claims, 4 Drawing Sheets

(56) References Cited

U.S. PATENT DOCUMENTS

2015/0309970 A1* 10/2015 Wuellner .............. G06F 1/3203
715/234
2015/0370901 A1* 12/2015 Sobeck ............. G06F 17/30864
707/710
2015/0370911 A1* 12/2015 Hanawa ............ G06F 17/30893
715/234

OTHER PUBLICATIONS

List of IBM Patents or Patent Applications Treated as Related—Aug. 12, 2015, pp. 1-2.

* cited by examiner

US 9,934,214 B2

DOM SNAPSHOT CAPTURE

BACKGROUND

The present disclosure relates to the field of video displays, and specifically to images displayed on video displays. Still more particularly, the present disclosure relates to capturing data used to generate images on video displays for future replay use.

Video displays are capable of displaying images, including webpages and other types of presentations. Webpages are often generated using objects from a Document Object Model (DOM), which represents Hypertext Markup Language (HTML), Extensible HTML (XHTML) and Extensible Markup Language (XML) documents used to generate the webpage. The DOM is represented as a node tree, called a DOM tree. The nodes of the DOM tree represent various components of the DOM.

SUMMARY

In an embodiment of the present invention, a document object model (DOM) snapshot is captured for later web session replay of a display on a client computer. A user-defined event on a client computer is detected. In response to detecting the user-defined event on the client computer, a DOM snapshot of a DOM is captured, wherein the DOM is an object model that identifies objects used by a hypertext markup language (HTML) document to generate a display of the client computer, and wherein the DOM snapshot is of a DOM being used to generate the display on the client computer. A hypertext markup language (HTML) request is populated with the DOM snapshot, wherein the HTML request is a virtual request that directs a recipient to save the HTML request without returning a webpage upon receipt. The HTML request with the DOM snapshot is transmitted to an HTML server. Subsequently, a request for the DOM snapshot is transmitted from the client computer to the HTML server. The client computer receives an HTML response from the HTML server, wherein the HTML response responds to the request for the DOM snapshot, and wherein the HTML response includes the DOM snapshot. A display is generated on the client computer using the DOM snapshot in the HTML response.

In an embodiment of the present invention, a document object model (DOM) snapshot is processed for later web session replay of an image from a display of a client computer. A hypertext markup language (HTML) request from a client computer is received at an HTML server, wherein the HTML request is a virtual request that directs the HTML server to save the HTML request without returning a webpage upon receipt, wherein the HTML request includes a DOM snapshot of a DOM, wherein the DOM is an object model that identifies objects used by an HTML document to generate an image on a display of the client computer, wherein the DOM snapshot is of a DOM being used to generate the image on the display of the client computer, and wherein the DOM snapshot is captured by the client computer in response to the client computer detecting a user-defined event on the client computer. The HTML server receives a request from the client computer for the DOM snapshot. The HTML server then transmits an HTML response to the client computer, wherein the HTML response includes the DOM snapshot, and wherein the DOM snapshot enables the client computer to generate an image on a display of the client computer using the DOM snapshot in the HTML response.

In an embodiment of the present invention, a computer program product captures a document object model (DOM) snapshot for later web session replay of an image from a display of a client computer. The computer program product comprises a computer readable storage medium having program code embodied therewith, wherein the computer readable storage medium is not a transitory signal per se, and wherein the program code is readable and executable by a processor to perform a method comprising: detecting a user-defined event on a client computer; in response to detecting the user-defined event on the client computer, capturing a DOM snapshot of a DOM, wherein the DOM is an object model that identifies objects used by a hypertext markup language (HTML) document to generate an image on a display of the client computer, and wherein the DOM snapshot is of a DOM being used to generate the image on the display of the client computer; populating a hypertext markup language (HTML) request with the DOM snapshot, wherein the HTML request is a virtual request that directs a recipient to save the HTML request without returning a webpage upon receipt; transmitting the HTML request with the DOM snapshot to an HTML server; transmitting a request for the DOM snapshot from the client computer to the HTML server; receiving an HTML response from the HTML server, wherein the HTML response responds to the request for the DOM snapshot, and wherein the HTML response includes the DOM snapshot that has been extracted from the saved HTML request; and generating an image on a display of the client computer using the DOM snapshot in the HTML response.

DETAILED DESCRIPTION

Figure 1:
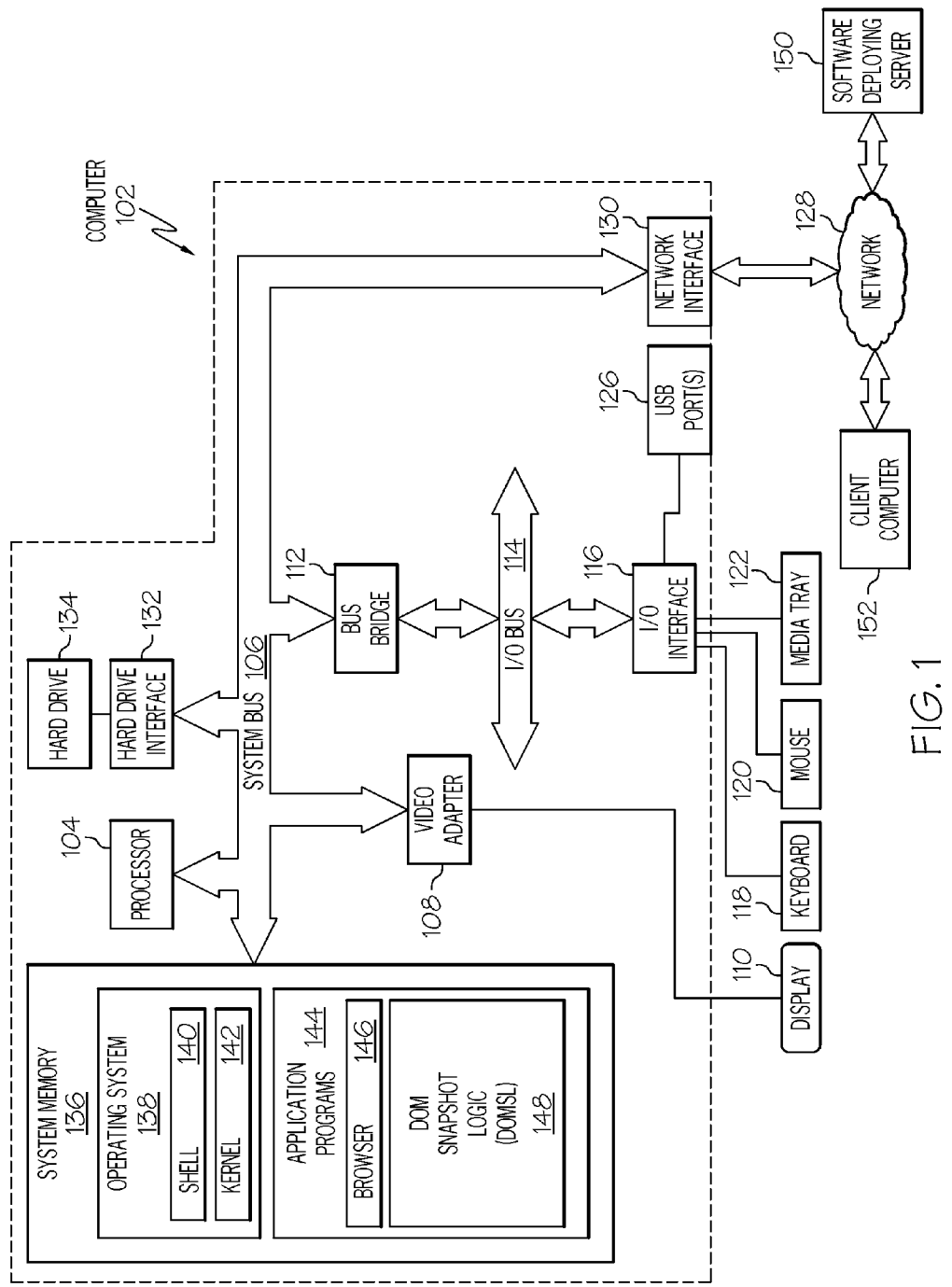
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or a client computer 152.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Document Object Model (DOM) Snapshot Logic (DOMSL) 148. DOMSL 148 includes code for implementing the processes described below, including those described in FIGS. 2-3. In one embodiment, computer 102 is able to download DOMSL 148 from software deploying server 150, including in an on-demand basis, wherein the code in DOMSL 148 is not downloaded until needed for execution. Note further that, in one embodiment of the present invention, software deploying server 150 performs all of the functions associated with the present invention (including execution of DOMSL 148), thus freeing computer 102 from having to use its own internal computing resources to execute DOMSL 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Note that computer 102 may be a desktop computer, a laptop computer, a tablet computer, a "smart" phone, or any other electronic device capable of processing data and/or executing instructions.

Figure 2:
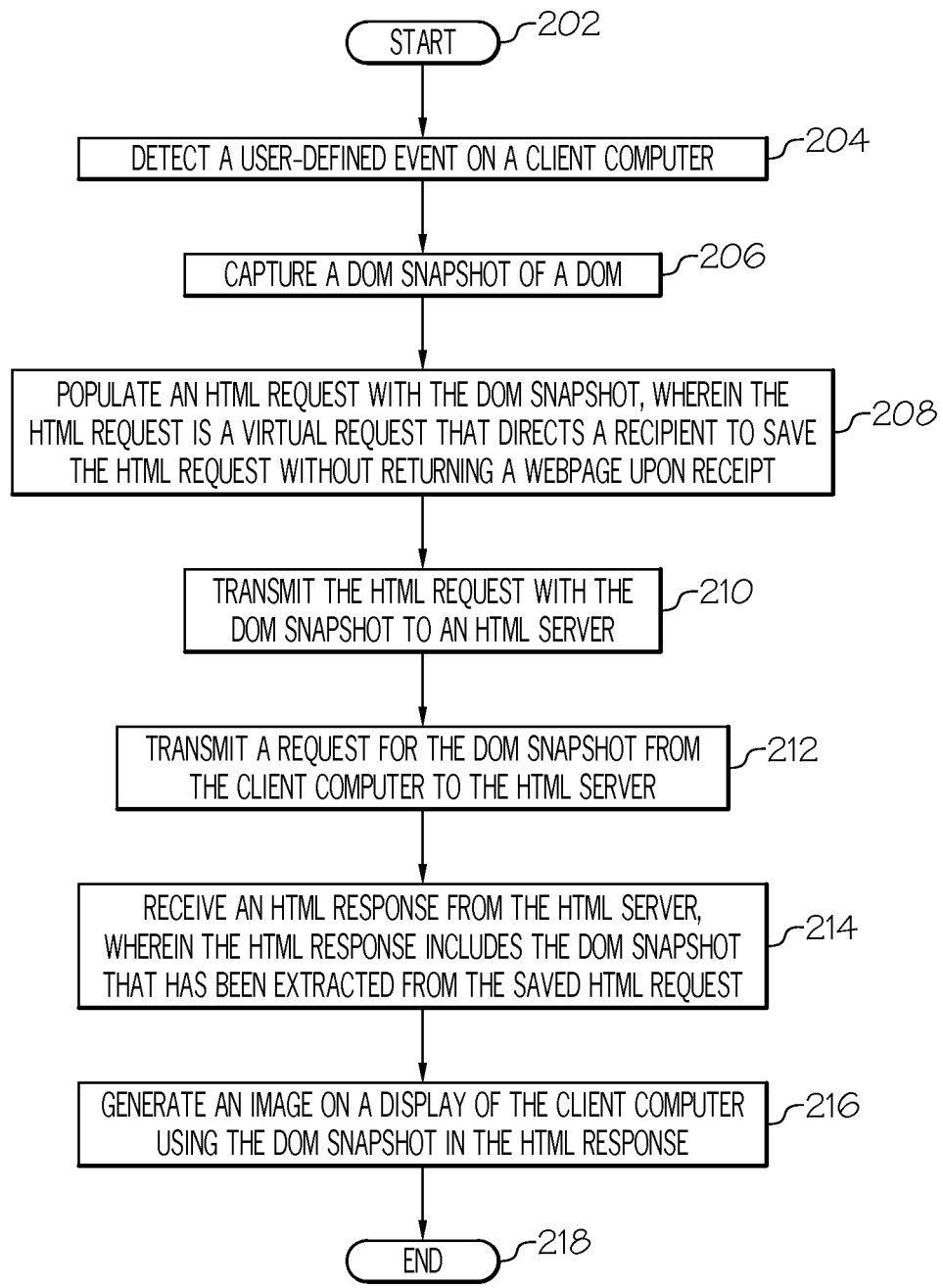
FIG. 2 is a high level flow-chart of one or more operations performed by one or more hardware devices to capture a document object model (DOM) snapshot for later web session replay of an image from a display of a client computer.

With reference now to FIG. 2, a high level flow-chart of one or more operations performed by one or more hardware devices to capture a document object model (DOM) snapshot for later web session replay of an image from a display of a client computer is presented.

After initiator block 202, a user-defined event on a client computer is detected (block 204). In an embodiment, the user-defined event is detected by the client computer itself (e.g., client computer 152 shown in FIG. 1). In an embodiment, the user-defined event is detected by a content server, such as a hypertext markup language (HTML) server. In FIG. 1, computer 102 represents an exemplary HTML server in this scenario. In an embodiment, the user-defined event is detected by both the client computer and the HTML server.

As indicated by the name, a "user-defined event" has been previously defined by a user. For example, consider the user interface (UI) 302 shown in FIG. 3. Within UI 302 is an interactive field 304, which allows that user to select an event from a pre-populated list of events, and/or to create his/her own event ("OTHER"). The user-defined/selected event is thus used as a trigger for capturing a Document Object Model (DOM) snapshot of the webpage.

For example, assume that a user has chosen the event "Customer making a payment" as his/her user-defined event. Assume further that a webpage allows a customer to make a payment, such as paying for a product, transferring money between bank accounts, etc., through the webpage (e.g., by linking the event to a hyperlink, etc.). Whenever the customer activates and executes a feature on the webpage to perform this action, a DOM snapshot of the webpage will be taken. A DOM is an object model that identifies objects used by an HTML document to generate an image on a display of the client computer. Thus, the DOM includes both HTML code in the HTML document, but also XML style information, Cascading Style Sheet (CSS) documents that control the appearance of the HTML document, etc. A DOM snapshot is thus a data capture of the DOM when the user-defined event occurs. In this example, a snapshot (i.e., a 100% capture of all information in the DOM) of the DOM is taken when the customer makes a payment using the website/webpage, thus capturing all information used to generate the website/webpage at the moment that the payment was made.

Figure 3:
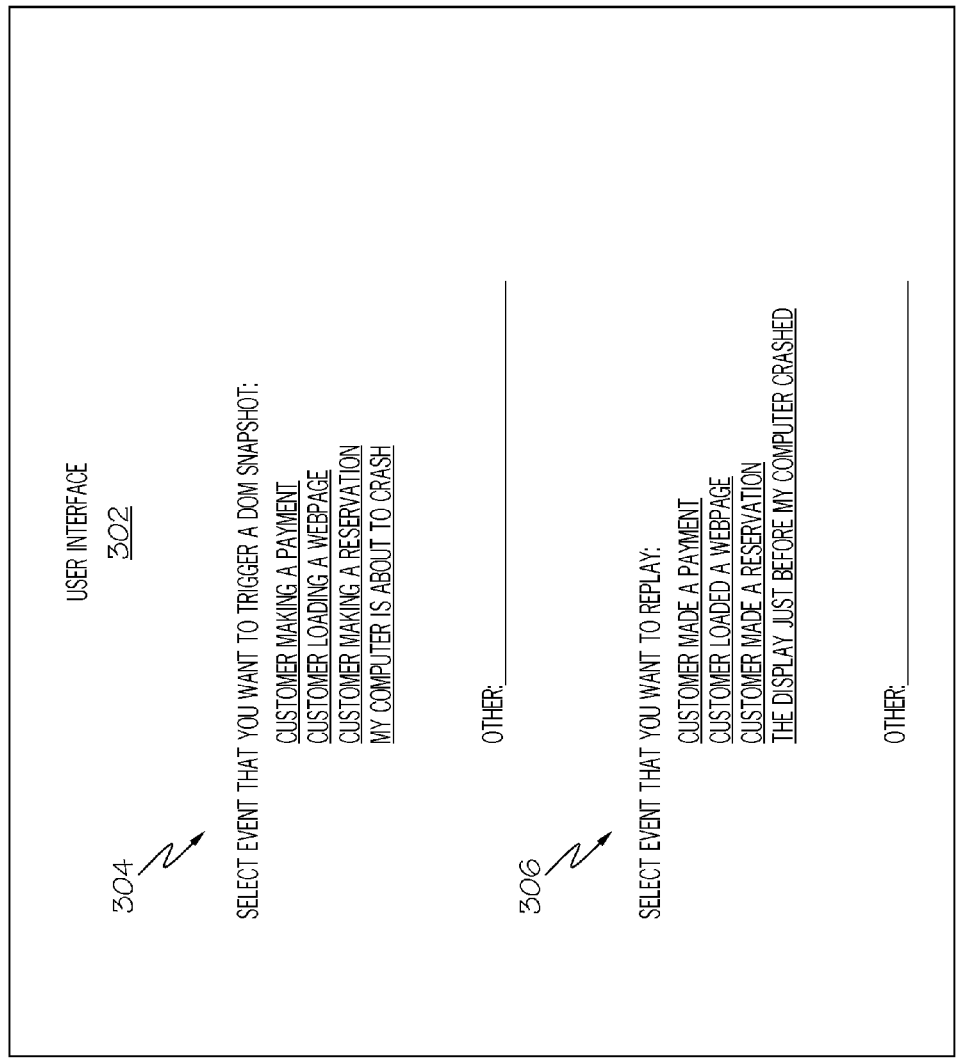
FIG. 3 illustrates an exemplary user interface with which the present invention may be implemented.

In another example from interactive field 304 in FIG. 3, the user-defined event may be "Customer loading a webpage". Thus, whenever the client computer loads a webpage, a DOM snapshot is taken of the DOM used to generate the webpage at the time that the customer loaded the webpage.

In another example from interactive field 304 in FIG. 3, the user-defined event may be "Customer making a reservation". Thus, whenever the user of the client computer makes a reservation for a service, a car rental, a hotel room, a meeting, etc., a DOM snapshot is taken of the DOM used to generate the webpage at the time the reservation was made.

As indicated in interactive field 304 in FIG. 3, the user may be allowed to create his/her own event description, other than what is shown in the pre-populated list of events. However, in one or more embodiments of the present invention, the user-created/defined event is limited to events that are related to the webpage/website being displayed at the time of the event. That is, the user-created/defined event is an event that is the result of an interaction with the webpage/website, or at least is the cause of a change to the webpage/website itself (e.g., a crash to the client computer that is displaying the webpage/website).

Thus, as described in block 206 of FIG. 2, in response to detecting the user-defined event on the client computer, a DOM snapshot of a DOM is captured, wherein the DOM is an object model that identifies objects used by a hypertext markup language (HTML) document to generate an image on a display of the client computer, and wherein the DOM snapshot is of a DOM being used to generate the image on the display of the client computer.

As described in block 208, a hypertext markup language (HTML) request is populated with the DOM snapshot. The HTML request is a virtual request that directs a recipient to save the HTML request without returning a webpage upon receipt. That is, the HTML request has a similar structure (e.g., header, port, etc.) as a traditional HTML request that requests an HTML document (e.g., a GET request requesting data for a webpage) from an HTML server. However, the HTML request described in block 208 has been modified to 1) include the DOM snapshot, and 2) instruct the HTML server to simply store the HTML request and the encapsulated DOM snapshot, rather than attempt to retrieve a new/updated webpage at that time. This stored HTML request and/or DOM snapshot are used later to populate an HTML response from the HTML server.

As described in block 210, the HTML request with the DOM snapshot is then transmitted to an HTML server (e.g. from client computer 152 to computer 102 in FIG. 1), wherein it is stored for later retrieval as described below.

As described in block 212, a request for the DOM snapshot is subsequently transmitted from the client computer to the HTML server. This request may take the form of an HTML request, or may be a message formatted in another style. For example, the request (whether as an HTML request or otherwise) includes instructions in the header and/or body that direct the HTML server to return, preferably as an HTML response, the DOM snapshot that was previously sent from the client computer. The DOM snapshot is identified, both in the modified HTML request (see block 210) as well as in the request (see block 212), by a unique identifier that is generated by the client computer.

As shown in FIG. 3, the user may select a particular DOM snapshot by choosing an event from a list of events that occurred, as shown in interactive field 306. For example, assume that the user wants to see what the DOM, and thus the associated webpage, looked like just as a "Customer made a payment" using the webpage. By clicking the appropriate line from interactive field 306, the user causes the client computer to generate a request for that DOM/webpage, and to send the request to the HTML server.

As described in block 214, the client computer then receives an HTML response, which responds to the request for the DOM snapshot, from the HTML server. The HTML response includes the DOM snapshot that has been extracted from the saved HTML request. That is, upon receiving the request, the HTML server searches for the identified DOM snapshot, which is still in the saved HTML request (see block 210) or has been saved to a different database after being extracted from the HTML request. The HTML server then populates an HTML response with the DOM snapshot, and transmits the DOM snapshot back to the client computer.

As described in block 216, this allows the client computer to generate an image on a display of the client computer using the DOM snapshot in the HTML response.

The flow-chart ends at terminator block 218.

Note that in one or more embodiments of the present invention, the DOM snapshot can be compressed before being sent to the HTML server, thus preserving bandwidth in a network between the client computer and the HTML server.

As described above, in an embodiment of the present invention, a list of events is presented on the client computer (see interactive field 304 in FIG. 3). One or more events from the list of events on the client computer that are selected by a user are received, and the one or more user-selected events from the list of events are defined as the user-defined event described above.

In an embodiment of the present invention, the client computer compresses the HTML request (that contains the DOM snapshot) before transmitting the HTML request to the HTML server, thus conserving bandwidth.

In one embodiment of the present invention, the DOM snapshot includes all objects (HTML, CSS, etc.) that were used to generate the screen image of the webpage at the time of the user-selected event. In another embodiment, however, only information needed to replay/recreate the webpage is saved in the DOM snapshot. For example, assume that the DOM snapshot includes browser code that is being used to retrieve/update/generate the webpage. This browser code may be static (e.g., reused on any and/or all webpages being generated on the client computer). Thus, there is no need to send the client-side script (e.g., JavaScript code) to the HTML server in the virtual HTML request (that contains the DOM snapshot). Thus, in this embodiment, the DOM comprises browser code that enables client-side scripts to control a browser on the client computer, and the method further comprises removing, by one or more processors, the browser code from the DOM snapshot prior to transmitting the HTML request with the DOM snapshot to the HTML server.

In an embodiment of the present invention, the DOM is changed by JavaScript prior to displaying the image on the client computer. That is, the DOM includes JavaScript that defines the appearance of the webpage. As above, in order to conserve bandwidth, one or more processors on the client computer remove the JavaScript from the DOM prior to transmitting the HTML request with the DOM snapshot to the HTML server, since this JavaScript will be available later on the client computer (assuming that the client computer uses the same JavaScript when enabling the HTTP code to generate the webpage).

In an embodiment of the present invention, the DOM comprises formatting files (e.g., cascading style sheet (CSS) files) that describe a formatting of the image on the client computer. As with the JavaScript scenario/embodiment just described, in order to conserver bandwidth, one or more processors in the client computer remove these formatting files from the DOM snapshot prior to transmitting the HTML request with the DOM snapshot to the HTML server.

In an embodiment of the present invention, the DOM snapshot that is retrieved from the HTML server is displayed on the client computer, either with the webpage itself (e.g., using an F12 key in a developer tools application), or else in a stand-alone manner. That is, in one embodiment, the DOM snapshot is presented on a display of the client computer without displaying the webpage that is created using the DOM in the DOM snapshot. This allows a user to deal directly with the code in the DOM (e.g., make changes to the code), without dealing with an IDE, which may impose certain actions when the DOM is changed.

In an embodiment of the present invention, the user-defined event that prompts the capture of the DOM snapshot is a linear set of events. That is, in order for the DOM snapshot to be taken, a series of events must first occur. For example, the series of events required to occur before the client computer automatically takes a DOM snapshot may be 1) a customer logs on; 2) the customer pulls up an old order (i.e., is not placing a new order); and 3) the customer pays with a credit card that is issued by some specific predetermined issuer (e.g., a particular bank). Assume that an error occurs with some predefined amount of frequency (e.g., 50% of the time) when these three events occur in this order. Thus, only when they occur in this order will the DOM snapshot be taken. Thus, in this embodiment, the method further comprises: receiving a set of rules, wherein the set of rules defines conditions during which the DOM snapshot of the DOM is allowed to be captured (e.g., the three exemplary events just described occur in the order shown); processing the set of rules to determine that capturing the DOM snapshot is prohibited unless the linear set of events is occurring on the client computer (i.e., no DOM snapshot can be taken unless one or more of the events described above are occurring); determining that the linear set of events has stalled before completion (e.g., step 3 above has never been reached), due to a crash in the system during step 1), step 2), and/or step 3)); and blocking any additional DOM snapshot captures on the client computer after the linear set of events has stalled (i.e., no additional DOM snapshots are permitted to be taken. That is, multiple DOM snapshots may be taken while steps/events 1-3 just described are occurring. However, if there is a stall (e.g., the browser showing the webpage crashes and/or the webpage server crashes), then no additional DOM snapshots are taken.

While the present invention has been described above from the perspective of the client computer, the invention is also applicable from the HTML server's perspective. Thus, from the HTML server's perspective, a method of processing a document object model (DOM) snapshot for later web session replay of an image from a display of a client computer comprises: receiving a hypertext markup language (HTML) request from a client computer, wherein the HTML request is a virtual request that directs the HTML server to save the HTML request without returning a webpage upon receipt, wherein the HTML request includes a DOM snapshot of a DOM, wherein the DOM is an object model that identifies objects used by an HTML document to generate an image on a display of the client computer, wherein the DOM snapshot is of a DOM being used to generate the image on the display of the client computer, and wherein the DOM snapshot is captured by the client computer in response to the client computer detecting a user-defined event on the client computer. The HTML server then saves the DOM snapshot, either with the HTML request or separately (after being extracted from the HTML request). The HTML server subsequently receives, from the client computer, a request for the DOM snapshot, and then transmits an HTML response to the client computer. As described herein, the HTML response includes the DOM snapshot, which enables the client computer to generate an image on a display of the client computer using the DOM snapshot in the HTML response.

Figure 4:
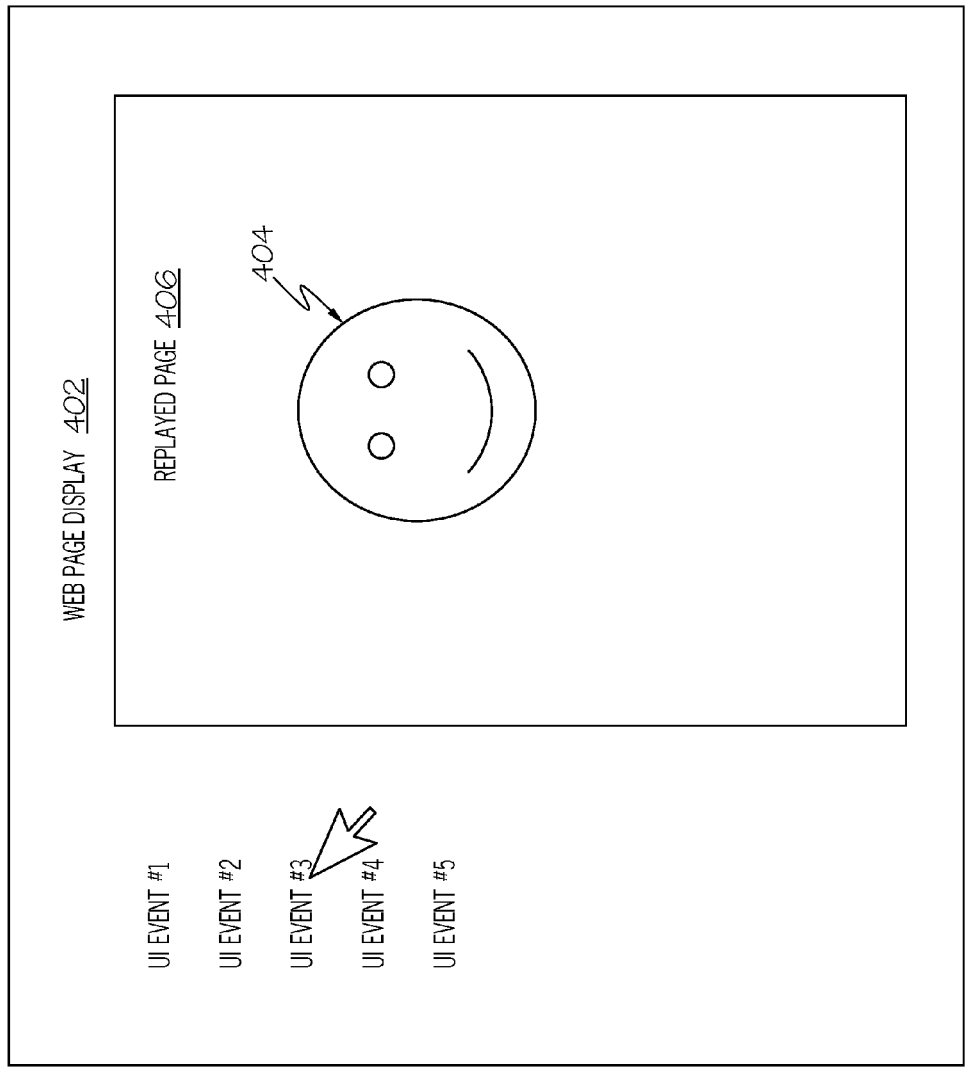
FIG. 4 depicts an exemplary user interface in which document objects related to user interface events are depicted along with a replayed page on a web page display.

With reference now to FIG. 4, an exemplary replay of a webpage in accordance with one or more embodiments of the present invention is presented. A list of user interface (UI) events 1-5 are presented on a web page display 402. Assume that UI event #3 is an object that generates image 404 on a replayed page 406. That is, the replayed page 406 is rendered by a browser, just like an original version of the page. Thus, replayed page 406 is what the user originally saw when UI event #3 took place. When the DOM Capture described herein is triggered (by a predefined event), a snapshot of the DOM is taken and sent (with the current states) to a server. This process is transparent to the end user (e.g., the end user is not aware of DOM Capture). As described herein, the DOM snapshot is stored as a "virtual http hit" on the server. During replay, the stored DOM is used to replay the corresponding event.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer program product for capturing a document object model (DOM) snapshot for later web session replay of an image from a display of a client computer, the computer program product comprising a computer readable storage medium having program code embodied therewith, wherein the computer readable storage medium is not a transitory signal per se, and wherein the program code is readable and executable by a processor to perform a method comprising:

detecting a user-defined event on a client computer, wherein the user-defined event is related to a navigation event on a webpage while the webpage is displayed on the client computer, and wherein the user-defined event activates and executes a functional feature of the webpage;

in response to detecting the user-defined event on the client computer, capturing a DOM snapshot of a DOM, wherein the DOM is an object model that identifies objects used by a hypertext markup language (HTML) document to generate an image of the webpage on a display of the client computer, and wherein the DOM snapshot is of a DOM being used to generate the image of the webpage on the display of the client computer at the time of the user-defined event;

populating a hypertext markup language (HTML) request with the DOM snapshot, wherein the HTML request is a virtual request that directs a recipient to save the HTML request without returning the webpage upon receipt;

transmitting the HTML request with the DOM snapshot to an HTML server;

transmitting a request for the DOM snapshot from the client computer to the HTML server;

receiving an HTML response from the HTML server, wherein the HTML response responds to the request for the DOM snapshot, and wherein the HTML response includes the DOM snapshot that has been extracted from the saved HTML request;

generating an image of the webpage at the time of the user-defined event on the display of the client computer using the DOM snapshot in the HTML response;

determining that an error in the client computer historically occurs at a predefined frequency in response to a series of events occurring on the client computer in a predetermined order;

detecting the series of events currently occurring on the client computer in the predetermined order; and in response to detecting the series of events currently occurring on the client computer in the predetermined order, capturing a DOM snapshot of the DOM after each event in the series of events occurs.

2. The computer program product of claim 1, wherein the method further comprises:

presenting, on a display on the client computer, a list of multiple events that are related to the navigation event on the webpage;

receiving, from the client computer, one or more events from the list of multiple events selected by a user; and defining one or more user-selected events from the list of multiple events as the user-defined event.

3. The computer program product of claim 1, wherein the DOM comprises browser code that enables client-side scripts to control a browser on the client computer, and wherein the method further comprises:

removing the browser code from the DOM snapshot prior to transmitting the HTML request with the DOM snapshot to the HTML server.

4. The computer program product of claim 1, wherein the DOM is changed by JavaScript code prior to displaying the image of the webpage on the display of the client computer, and wherein the method further comprises:

removing the JavaScript code from the DOM prior to transmitting the HTML request with the DOM snapshot to the HTML server.

5. The computer program product of claim 1, wherein the DOM comprises formatting files that describe a formatting of the image of the webpage on the display of the client computer, and wherein the method further comprises:

removing the formatting files from the DOM snapshot prior to transmitting the HTML request with the DOM snapshot to the HTML server.

6. The computer program product of claim 1, wherein the method further comprises:

presenting the DOM snapshot on the client computer without displaying the webpage that is created using the DOM in the DOM snapshot.

7. The computer program product of claim 1, wherein the user-defined event is a linear set of events, and wherein the method further comprises:

receiving a set of rules, wherein the set of rules defines conditions during which the DOM snapshot of the DOM for the webpage is allowed to be captured;

processing the set of rules to determine that capturing the DOM snapshot for the webpage is prohibited unless the linear set of events is occurring on the client computer;

capturing DOM snapshots of the DOM during each event from the linear set of events before the linear set of events stalls; and blocking any additional DOM snapshot captures of the webpage on the client computer after the linear set of event stalls.

8. The computer program product of claim 1, wherein the user-defined event is a party navigating through the webpage order to make a payment via the webpage.

9. The computer program product of claim 1, wherein the method further comprises:

in response to detecting that a remote computer is loading the webpage, capturing another DOM snapshot of the DOM for the webpage.

10. The computer program product of claim 1, wherein the method further comprises:

in response to detecting an imminent crash of the client computer, capturing another DOM snapshot of the DOM for the webpage, wherein the imminent crash of the client computer has been predetermined to after the webpage.

* * * * *